United States Patent
Paul et al.

(10) Patent No.: US 9,634,844 B2
(45) Date of Patent: Apr. 25, 2017

(54) DETECTION SCHEME FOR FOUR WIRE PAIR POWER OVER ETHERNET SYSTEM

(71) Applicant: Linear Technology Corporation, Milpitas, CA (US)

(72) Inventors: Michael Paul, Santa Barbara, CA (US); Jeffrey Heath, Santa Barbara, CA (US); David Dwelley, Santa Barbara, CA (US); Heath Stewart, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 295 days.

(21) Appl. No.: 14/607,608

(22) Filed: Jan. 28, 2015

(65) Prior Publication Data

US 2015/0215131 A1    Jul. 30, 2015

Related U.S. Application Data

(60) Provisional application No. 61/933,707, filed on Jan. 30, 2014.

(51) Int. Cl.
*G06F 1/26*    (2006.01)
*H04L 12/10*    (2006.01)

(52) U.S. Cl.
CPC ............... *H04L 12/10* (2013.01); *G06F 1/26* (2013.01)

(58) Field of Classification Search
CPC ..... G06F 1/32; G06F 1/26; G06F 1/28; G06F 1/00; G06F 9/44
USPC ....... 713/300, 310, 320, 321, 322, 323, 324, 713/330, 340, 375
See application file for complete search history.

(56) References Cited

U.S. PATENT DOCUMENTS

| | | | |
|---|---|---|---|
| 7,355,416 B1* | 4/2008 | Darshan | H04L 12/10 324/713 |
| 2005/0122140 A1 | 6/2005 | Peker et al. | |
| 2006/0209875 A1* | 9/2006 | Lum | H04L 12/10 370/445 |
| 2006/0244462 A1 | 11/2006 | McCosh et al. | |
| 2009/0063874 A1 | 3/2009 | Diab | |
| 2013/0113275 A1* | 5/2013 | Dwelley | H04L 12/10 307/1 |

OTHER PUBLICATIONS

EP Application No. 15000281.4, Extended European Search Report:, Jun. 1, 2015, 6 pages.

* cited by examiner

*Primary Examiner* — Jaweed A Abbaszadeh
*Assistant Examiner* — Keshab Pandey
(74) *Attorney, Agent, or Firm* — Patent Law Group LLP; Brian D Ogonowsky

(57) ABSTRACT

In a method performed by a PoE system, a PSE is able to detect whether a PD is compatible for receiving power via four wire pairs in the standard Ethernet cable. The PSE provides a current limited voltage to a first and second pair of wires in the cable, during a detection phase, to detect a characteristic impedance of the PD. In the PSE, a first resistor is connected to a third wire pair and a second resistor is connected to a fourth wire pair. During the detection phase, the PSE detects the relative currents through the resistors. If the currents are the same, then the PSE knows the PD is able to receive power via the four wire pairs. The PSE then applies the full PoE voltage to the first and second wire pairs and connects the third and fourth wire pairs to a low voltage via a MOSFET.

18 Claims, 4 Drawing Sheets

DETECTION SCHEME FOR FOUR WIRE PAIR POWER OVER ETHERNET SYSTEM

CROSS-REFERENCE TO RELATED APPLICATIONS

This application claims priority to U.S. provisional application Ser. No. 61/933,707 filed Jan. 30, 2014, by Michael Paul et al., incorporated herein by reference.

FIELD OF THE INVENTION

This invention relates to systems, such as Power Over Ethernet (PoE), where power is transmitted over data lines and a routine is carried out before the full PoE voltage is applied to the data lines. The invention more particularly relates to a scheme that identifies to the Power Sourcing Equipment (PSE) that the Powered Device (PD) is PoE-enabled for power delivery over four wire pairs.

BACKGROUND

It is known to transmit power over data lines to power remote equipment. Power Over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the switch is transmitted over two sets of twisted pair wires in the standard CAT-5 cabling. The same two sets of twisted pair wires may also transmit differential data signals, since the DC common mode voltage does not affect the data. In this way, the need for providing any external power source for the "Powered Devices" (PDs) can be eliminated. The standards for PoE are set out in IEEE 802.3, incorporated herein by reference. The CAT-5 cable has four twisted wire pairs, and two of the wire pairs are typically not used.

Providing power over data lines is applicable to other existing systems and future systems. For example, electronic equipment in automobiles will increasingly benefit from power to the equipment being provided over the data lines to reduce wiring. Various new systems using power over data lines may be standardized by the IEEE or other groups.

The present invention applies to systems requiring some sort of indication from the PD that the full PoE voltage is to be applied to the wire pairs. Although the present invention may be applied to any system using power over data lines, a typical PoE system will be described as an example.

FIG. 1 represents a typical Ethernet system using PoE. In the example of FIG. 1, a "Power Sourcing Equipment" (PSE) 12 may be any Ethernet device that supplies power and data to a PD. The PSE 12 and PD 14 are typically connected via a standard CAT-5 cable terminated with the standard Ethernet 8-pin (four twisted pairs) RJ45connector. Only two of the twisted pairs are typically needed for PoE and data.

The PSE 12 is typically powered by the mains voltage (120 VAC) and uses either an external or internal voltage converter 16 to generate a DC voltage between 44-57 volts. The PoE standards require the PSE to supply a minimum of 37 volts at the PD. The voltage drop along the cable increases with distance.

Two of the twisted pairs 18 and 20 are assigned to carry the PoE power, and these pairs may also carry differential data. The remaining, unused two pairs 21 and 22 are also shown. All pairs in use are terminated at the PD 14 by transformers, such as transformers 23 and 24. It is assumed that the twisted pair 18 provides 44 volts and the twisted pair 20 is connected to ground or to some other low voltage. A connection is made to the center tap of transformers 23 and 24 to provide the 44 volts to the PD 14. Since the DC voltage is common mode, it does not affect the differential data. Other conventional termination circuitry is also included in the PD termination block 25, such as polarity correction circuitry (a diode bridge) downstream from the transformers, but is not relevant to the present invention.

The 44 volts is applied to a DC-DC converter 26 for converting the voltage to any voltage or voltages required by the PD 14. The load 28 (e.g., a security camera) is powered by the converter 26 and communicates with the PSE 12 via the twisted wire pairs.

The IEEE standards require certain low current handshaking procedures between the PSE 12 and PD 14 in order to detect the presence of a PoE-powered device and in order to convey the pertinent characteristics of the PSE 12 and PD 14 prior to the PSE 12 making the full power available to the PD 14. The detection/classification circuit 29 controls the handshaking routine, and may be a state machine, a processor, or any other suitable control circuit. The PSE 12 also contains a circuit for carrying out the handshaking routine. The circuits for carrying out the handshaking routine are well-known ICs.

Below is a simplified summary of the handshaking routine between the PSE 12 and the PD 14.

When the PSE 12 is first connected to the PD 14 via an Ethernet cable, the PSE 12 interrogates the PD 14 to determine if it is PoE-enabled. This period is termed the detection phase. During the detection phase, the PSE 12 applies a first current limited voltage for a fixed interval to the PD 14, via the twisted wire pairs 18 and 20, and then applies a second current limited voltage for a fixed interval, while looking for a characteristic impedance of the PD 14 (about 25 k ohms) by detecting the resulting current. If the correct impedance is not detected, the PSE 12 assumes that the load is not PoE-enabled and shuts down the PoE generating end. The system then operates as a standard Ethernet connection.

The detection can also be done using two voltage limited currents.

If the signature impedance is detected, the PSE 12 moves on to an optional classification phase. The PSE 12 ramps up the voltage to the PD 14. The PSE 12 generates either one pulse (indicating it is a Type 1 PSE) or two pulses (indicating it is a Type 2 PSE). The PD 14 responds to the classification pulses with certain current levels to identify whether the PD 14 is Type 1 or Type 2. A Type 1 PD requires less than 13 W. A Type 2 PD requires up to a maximum of 25.5 W. Various classes (e.g., five classes), each associated with a maximum average current level and a maximum instantaneous current level, within these types may also be identified. The PSE 12 then may use this power demand information to determine if it can supply the required power to the PD 14, and the PD 14 uses the information to determine if it can fully operate with the PSE 12. There are maximum time windows for the detection and classification phases (e.g., 500 ms).

Other types of detection and classification routines and standards may be implemented in the future.

On completion of the detection and classification phases, the PSE 12 ramps its output voltage above 42 V. Once an under-voltage lockout (UVLO) threshold has been detected at the PD 14, an internal FET is turned on to connect the full PoE voltage to the converter 26, and the converter 26 supplies a regulated DC voltage to the load 28. At this point, the PD 14 begins to operate normally, and it continues to operate normally as long as the input voltage remains above a required level.

For some types of PoE applications, such as high power applications, it is desirable to apply the positive voltage over two of the wire pairs and apply the low voltage (e.g., 0 volts) over the remaining two wire pairs. Thus, the load current is shared by the four wire pairs. The conventional way of doing this is to use a first PSE that supplies the positive voltage to a first wire pair and the low voltage to a second wire pair and to use a second PSE, identical to the first PSE, that supplies the positive voltage to a third wire pair and the low voltage to the remaining fourth wire pair. Note that PSE power is applied with isolated power supplies, so the low voltage is not ground although it may be 0 volts.

Each PSE independently performs a detection and classification routine to determine if the PD is PoE enabled. A drawback of this type of PoE system is that two complete PSE systems are required, adding cost and size to the system.

What is needed is a new technique to supply power to a PD that uses all four wire pairs in the Ethernet cable to allow for high power applications, where only a single PSE is required.

SUMMARY

A single PSE supplies power to a PD, via a conventional CAT-5 Ethernet cable, where all four twisted wire pairs supply the DC power to the PD to potentially supply a high power to the PD. Two of the pairs (Pair 1 and Pair2) supply the positive voltage, and the remaining two pairs (Pair3 and Pair4) are connected to the low voltage (e.g., 0 volts). In another embodiment, the supplied voltages may be other voltage levels, since the PD is powered by the voltage difference. A transformer termination still allows differential data to be transmitted over the wire pairs.

During a low voltage/detection phase (specified by the IEEE standards), the PSE applies a current limited voltage to the Pairs 1 and 2 to detect a certain characteristic impedance of the PD that indicates that the PD is PoE enabled. Other detection techniques can be used. Assuming a 25 k ohm resistor is connected in the PD across Pairs1/2 and Pairs3/4, a characteristic current will flow through Pairs 3 and 4.

A first low value resistor R1 has one end connected to the Pair3, and a second equal value resistor R2 has one end connected to the Pair4. The other ends of the resistors R1 and R2 are tied together and are connected to a current sensor. This common end is also connected to a MOSFET (or other type switch) that can couple the Pairs 3 and 4 to the low voltage when turned on.

During the low voltage/current detection phase, the PoE simultaneously detects the respective currents through the resistors R1 and R2 while the MOSFET is on. In another embodiment, the MOSFET may be off and the resistors R1 and R2 are connected to the low voltage during the detection phase by another connection. If the Pair3 and Pair4 are connected together at the PD in a "single channel PD," then approximately equal currents will flow through both Pair3 and Pair4 during the detection phase. If the PD is a "dual channel PD," then separate 25k ohm resistors will be connected to Pair 3 and Pair4, and similar currents will still flow through the resistors R1 and R2.

If the currents are approximately equal and characteristic of the PD being PoE enabled, the PSE supplies the full positive voltage to the Pairs 1 and 2 and keeps the MOSFET on that couples Pairs 3 and 4 to ground or other low voltage. In the embodiment where the MOSFET is off during the detection phase and the resistors R1 and R2 are connected to the low voltage by another connection, the MOSFET is then turned on at the end of the detection phase and becomes the only connection of the resistors R1 and R2 to the low voltage. Since the full positive voltage is applied to the Pairs 1 and 2, and Pairs 3 and 4 are coupled to the low voltage, the PD (whether single channel or dual channel) receives the power via the four pairs of wires.

Therefore, the detection of whether the PD is to receive power via four wire pairs is performed by a single PSE during a conventional detection phase specified by the IEEE standards.

Any classification routine can also be carried out prior to the full positive voltage being applied between the positive pairs Pair1 and Pair2, and the low voltage pairs Pair3 and Pair4.

During operation, the sum of the currents through the resistors R1 and R2 may be detected to determine if the operating current is within acceptable limits. If not, the MOSFET is turned off.

Various other embodiments are described.

The terms PSE and PD are used throughout this disclosure to identify equipment that supplies power and equipment that receives the power, and such equipment/devices are not limited to Ethernet equipment/devices unless specified.

BRIEF DESCRIPTION OF THE DRAWINGS

Elements that are the same or equivalent are labeled with the same numeral.

DETAILED DESCRIPTION

Figure 2:
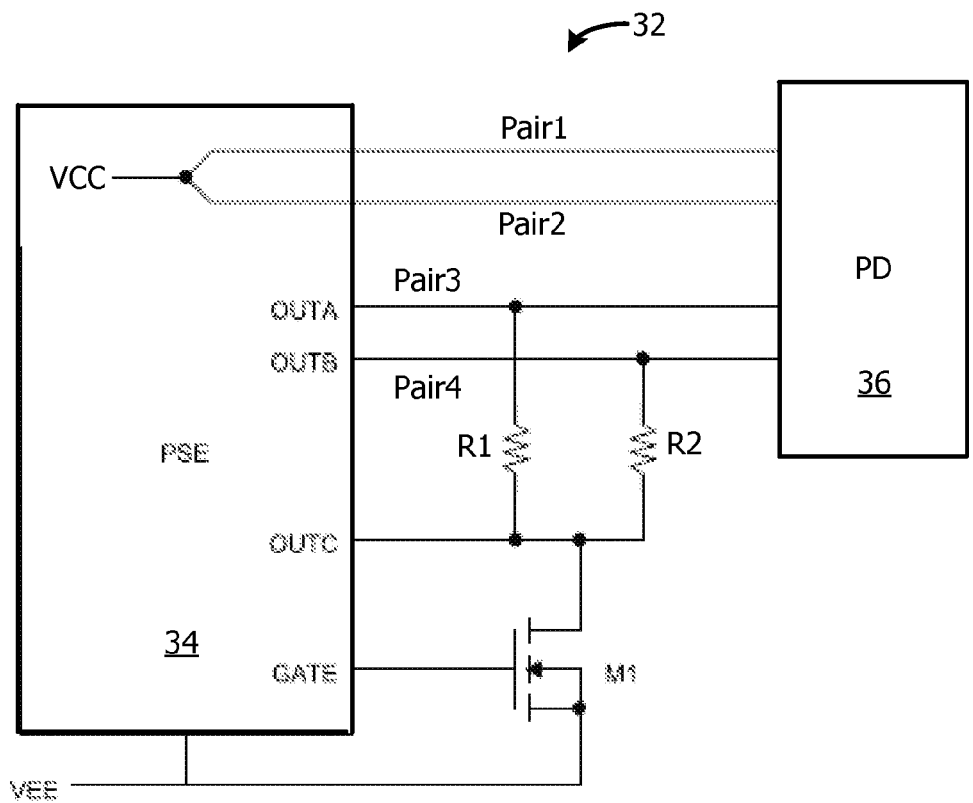
FIG. 2 illustrates a single channel PoE system, in accordance with one embodiment of the invention, that detects currents flowing through two of the wire pairs to determine whether the PD is to receive power via the four wire pairs.

FIG. 2 illustrates a high level diagram of the PoE system 32, in accordance with one embodiment of the invention, where a PSE 34 is applying the full PoE positive voltage (VCC) to the wire pairs Pair1 and Pair2. Pair3 and Pair4 are coupled via low value resistors R1 and R2 to the drain of a MOSFET M1. Assuming the PD 36 is compatible with supplying power via the four wire pairs, the MOSFET M1 is turned on to couple the Pairs 3 and 4 to VEE, typically zero volts. Since the system is not referenced to ground, only the difference between VCC and VEE is significant. The resistors R1 and R2 and the MOSFET M1 are considered part of the PSE and may be within the same package as the PSE controller and other circuitry.

Figure 3:
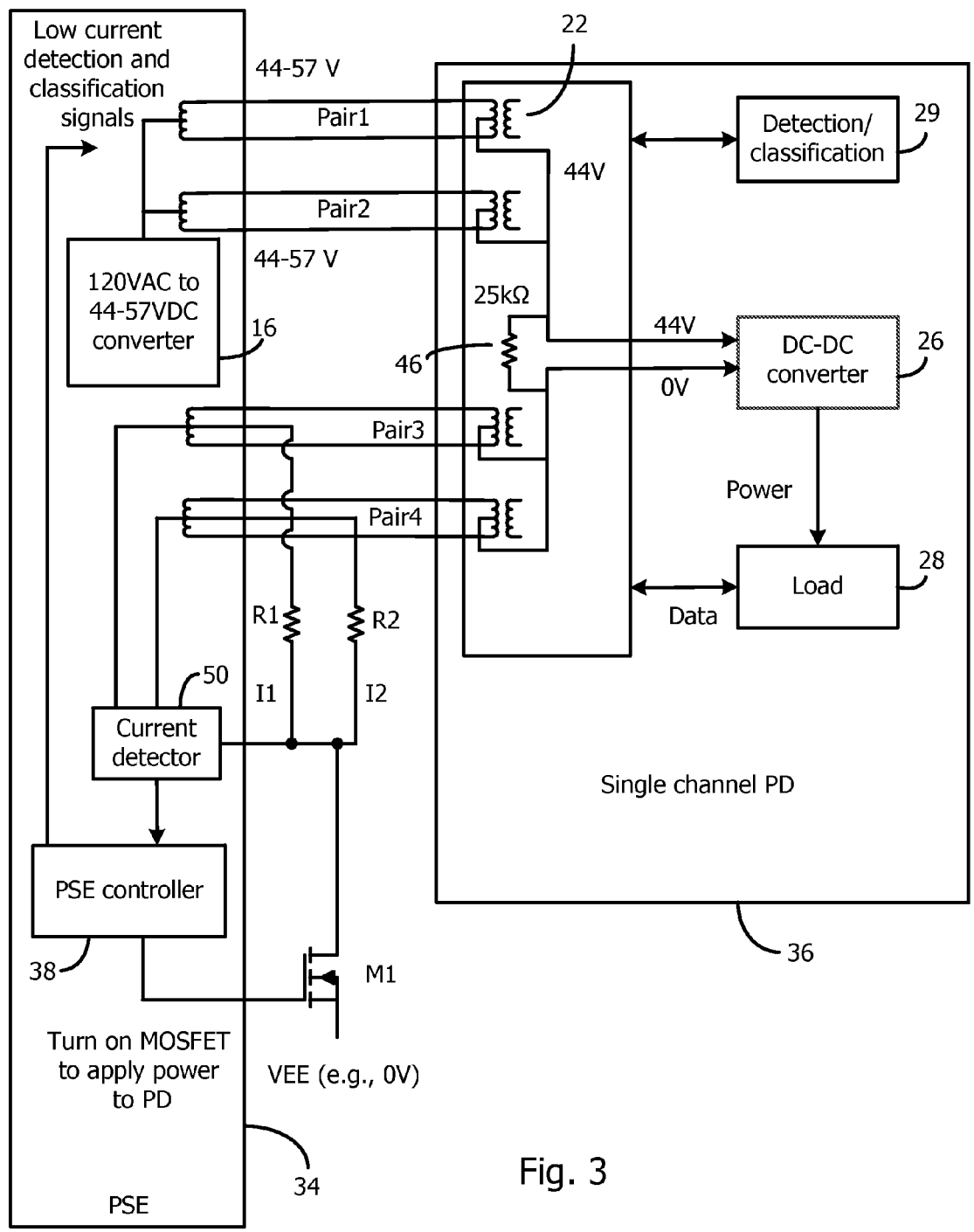
FIG. 3 illustrates the circuit of FIG. 2 in more detail.

FIG. 3 illustrates the PSE 34 and PD 36 in more detail. Circuitry that is not shown may be conventional, such as the differential data transmission circuitry, under-voltage lock-out circuitry, and other protection circuitry. Any circuits labeled with the same numbers as in FIG. 1 perform the same function and may be conventional.

A PSE controller 38 carries out a detection and classification routine that may be in accordance with the IEEE standards for PoE. The PSE controller 38 also controls the MOSFET M1 to couple the wire Pairs 3 and 4 to the low voltage during the detection/classification phase and during operation when the full voltage is applied to the Pairs 1 and 2. The controller 38 may include a programmed processor, a state machine, logic circuits, or any other suitable circuit.

In another embodiment, the MOSFET M1 may be off during the detection phase and the resistors R1 and R2 are connected to the low voltage (via port OUTC in FIG. 2) during the detection phase by another switch or any other type of circuit within the PSE 34. In one embodiment, the MOSFET M1 is supplied by the user and is external to an IC package housing the PSE controller and detection circuitry. This is because the PD load current may be high and requires a robust MOSFET M1. However, the current during the detection/classification phase is low and can be conducted by a different switch (or other circuit) internal to the IC package.

The operation of the circuit of FIG. 3 is described with reference to the flowchart of FIG. 4.

Figure 4:
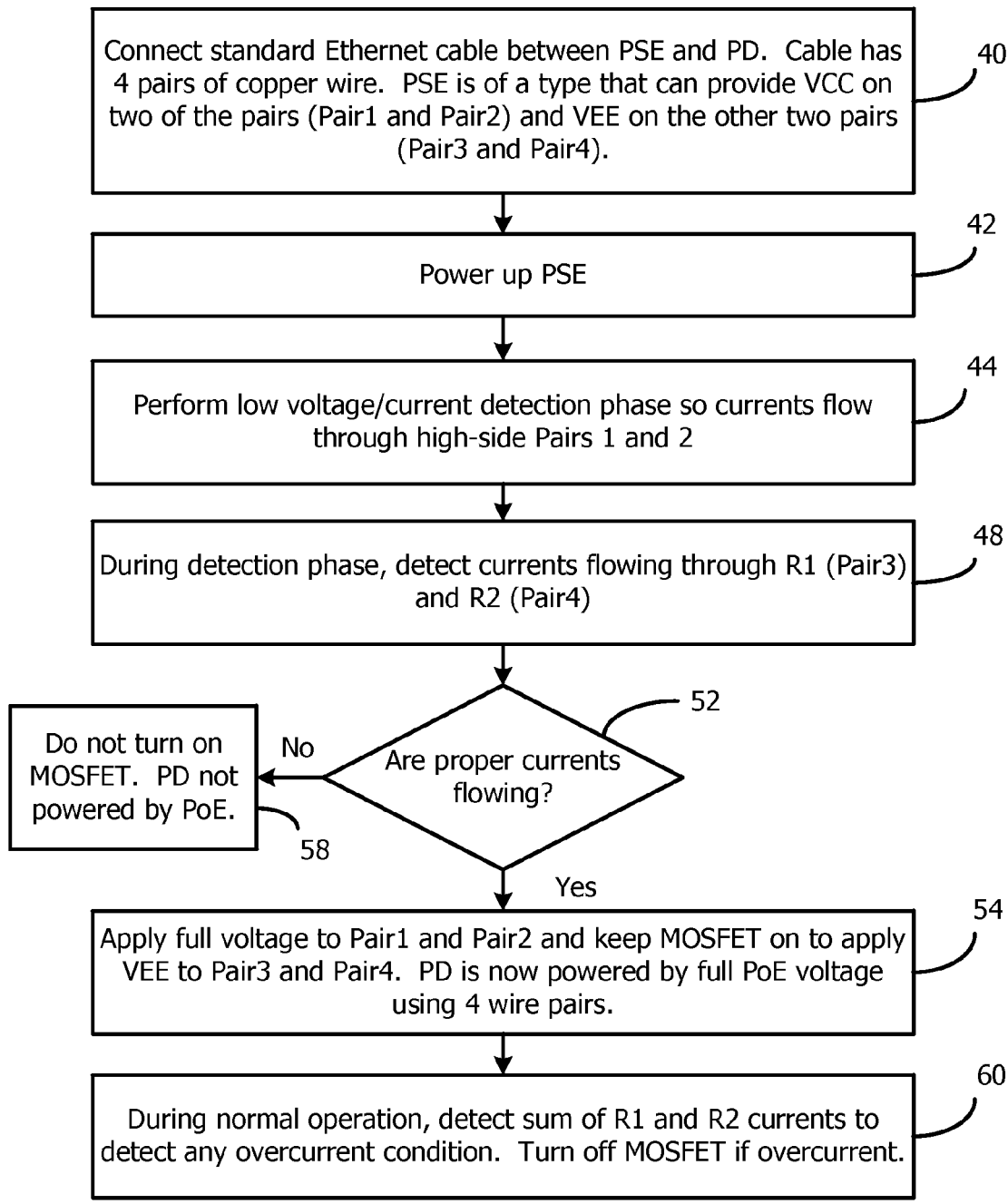
FIG. 4 is a flowchart identifying certain steps performed by the system of FIG. 3.
Figure 5:
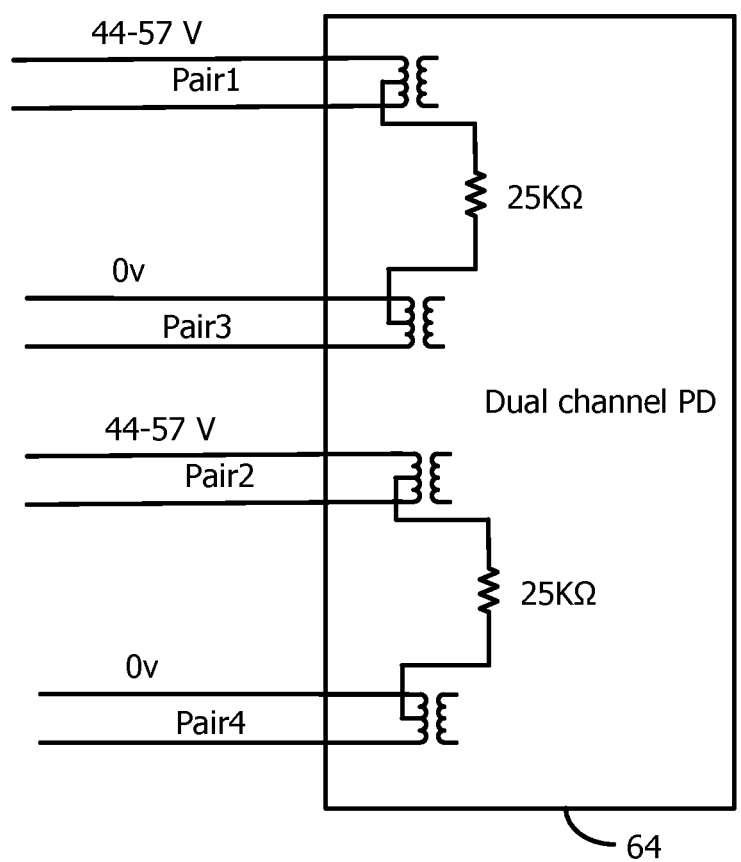
FIG. 5 illustrates the front end of a dual channel PD, where separate characteristic impedances are connected across two sets of wire pairs. The PSE supplies power to the PD via the four wire pairs.

In step 40 of FIG. 4, the PSE 34 is connected to the PD 36 via a standard CAT-5 Ethernet cable having four twisted wire pairs. It is assumed the PD 36 is PoE compatible and can receive power via the four wire pairs.

In step 42, the PSE 34 is powered up, such as by connecting it to 120 VAC and turning on a power switch. Alternatively, the PSE 34 is powered up by inserting a board (containing the PSE) into a bus.

In step 44, the low voltage/current detection phase is automatically carried out by the PSE controller 38.

Figure 1:
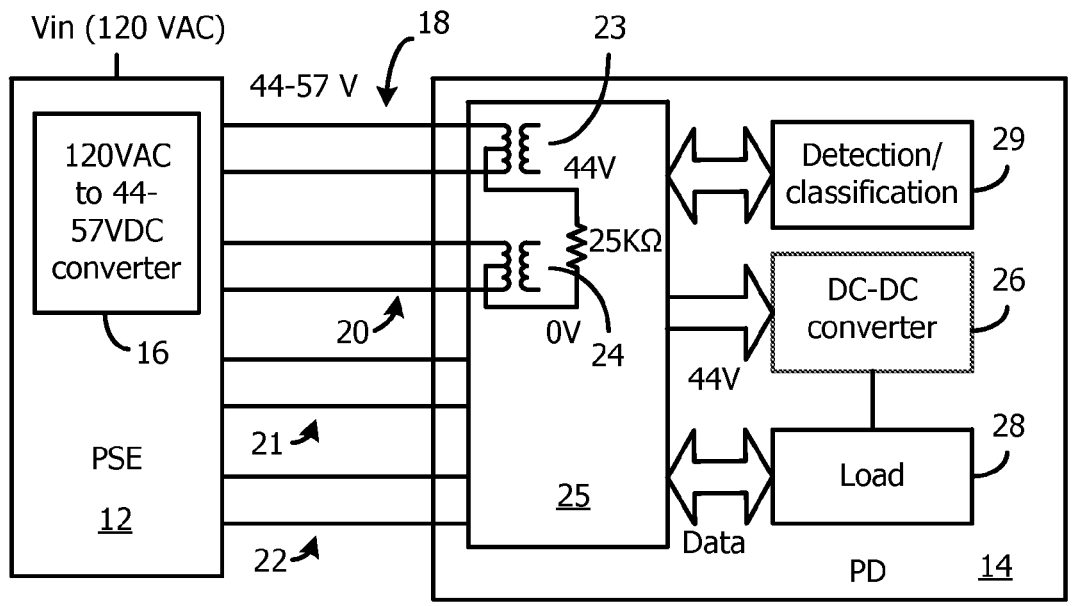
FIG. 1 illustrates a conventional PoE-enabled Ethernet system using two wire pairs for supplying power to the PD.

The generated detection signals may be the same as described with respect to FIG. 1. The PSE controller 38 supplies the current limited voltages (specified by the IEEE standards) to the Pairs 1 and 2 to detect the characteristic impedance provided by the 25 k ohm resistor 46. In one embodiment, the MOSFET M1 is on at this time and, in another embodiment, the MOSFET M1 may be off and the resistors R1 and R2 are connected to the low voltage via a switch in the PSE 34. The voltage converter 16 is off or isolated so the full voltage is not coupled to the Pairs 1 and 2. The detection signals create low currents in Pairs 1/2 and Pairs3/4 (step 48). Other detection mechanisms may be used besides detecting a 25 k ohm resistor.

A first low value resistor R1 has a first end connected to the Pair3 and a second end connected to a current detector 50 and to the drain of the MOSFET M1. A second low value resistor R2, equal to the value of R1, has a first end connected to the Pair4 and a second end connected to the current detector 50 and to the drain of the MOSFET M1. The current detector 50 can determine the relative currents through the resistors R1 and R2 by detecting the voltage drops across the resistors using a difference amplifier and then applying Ohm's Law.

Conventional logic and amplifier circuitry is used in the current detector 50 or PSE controller 38 for detecting whether the two currents are substantially the same or different and detecting that the currents are not characteristic of the PD 36 being PoE enabled.

In step 52, the current detector 50 detects the relative currents through resistors R1 and R2. If the currents are the same and characteristic of the PD 36 being PoE enabled, it means that both Pairs 3 and 4 are connected within the PD 36 at least through the 25 k ohm resistor 46.

If the detected currents are very different, then either wire Pair3 or wire Pair4 is not connected to provide power to the PD 36 using the four wires. This means that the PSE 34 and PD 36 are not compatible for PoE.

In step 54, if the currents through resistors R1 and R2 are approximately the same and within a proper current range, the PSE 34 applies the full voltage to the Pairs 1 and 2 and keeps the MOSFET M1 on so that the operating current flows through resistors R1 and R2. To supply the full voltage to the Pairs 1 and 2, the PSE controller 38 may control the voltage converter 16 to be enabled or close a switch that connects the converter 16 output to the Pairs 1 and 2.

In the alternative embodiment where the MOSFET M1 is off during the detection phase and the resistors R1 and R2 are connected to the low voltage by a switch in the PSE 34, the MOSFET M1 is then turned on at the end of the detection phase and becomes the only connection of the resistors R1 and R2 to the low voltage.

In step 58, if the currents are different or not within the proper range, the PSE controller 38 shuts off the MOSFET M1 and does not supply the full voltage to the PD 36.

In step 60, during normal operation of the system when the PSE 34 is supplying the full voltage to the PD 36 and the operating current flows through resistors R1 and R2, the sum of the currents through the resistors R1 and R2 is detected by the current sensor 50. If the current exceeds a maximum threshold, either indicating a fault or a current too large for the MOSFET M1, the PSE controller 38 shuts off the MOSFET M1. If the detected current is too low, the PSE 34 is required to terminate power to the PD 36 as it is an indication that the PD 36 has been disconnected. A fault signal may be generated to indicate to an operator that there is a fault in the system.

A classification phase may occur any time prior to the full voltage being applied to the PD 36.

Accordingly, the system of FIG. 3 detects whether the PD 36 is compatible for receiving power via the four wire pairs while performing an otherwise conventional detection step. Power delivery is controlled by the single MOSFET M1. The same circuit is then used during normal operation to detect an over-current situation.

FIG. 4 illustrates the front end of a dual channel PD 64 where one channel receives power via the Pairs 1 and 3, and a second channel receives power via the Pairs 2 and 4. The various power leads may be connected to the same load in the PD 64 so the power is shared by the two channels. Each channel includes a 25 k ohm resistor for providing the characteristic impedance to the PSE indicating that the PD 64 is PoE enabled. During the detection phase, the current sensor 50 (FIG. 3) will detect that the currents through the resistors R1 and R2 (connected to Pairs 3 and 4) are proper and equal, causing the PSE to provide the full voltage to the PD 64 and keep the MOSFET M1 on.

Variations of the described circuitry are envisioned where electrical characteristics of the Pairs 3 and 4 are detected during the low voltage/current handshaking phase to determine if the PD is configured for receiving power via the four wire pairs. The MOSFET M1 may instead be a bipolar transistor or any other switch and may include a plurality of transistors connected in parallel. The term switch includes any circuitry that couples the resistors R1 and R2 to the low voltage. The resistors R1 and R2 may be replaced with any device that can provide a known resistance value or measure current. Therefore, the resistors R1 and R2 can be any component that can be used to detect a current.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power Over Ethernet (PoE) system for supplying power via four wire pairs in an Ethernet cable comprising:
   Power Sourcing Equipment (PSE) providing data and voltage over Ethernet wires, the PSE having a voltage source for generating a PoE voltage for transmission on the Ethernet wires, the Ethernet wires comprising four pairs of wires;
   a Powered Device (PD) connected to the PSE by at least the Ethernet wires to receive the data and voltage, the PD presenting PoE characteristics to the PSE upon the PD receiving a first signal during a handshaking phase prior to a full voltage level being applied to the PD;
   the PSE further comprising:
      a controller for controlling the first signal to be applied to a first set of Ethernet wires including a first pair of wires and a second pair of wires;
      a first current detection component coupled between a third pair of wires in the Ethernet wires and a switch;
      a second current detection component coupled between a fourth pair of wires in the Ethernet wires and the switch;
      the controller for detecting that the currents through the first current detection component and the second current detection component are approximately equal, consistent with the first pair of wires and the second pair of wires being connected together at the PD, and of a magnitude characteristic of the PD being PoE-enabled while the PSE supplies the first signal to the PD, and, in response, controlling the PSE to apply the full PoE voltage to the first pair of wires and the second pair of wires while the switch is closed to cause the third pair of wires and the fourth pair of wires to be coupled to a low voltage via the switch.

2. The system of claim 1 wherein the first current detection component is a first resistor and the second current detection component is a second resistor having a resistance equal to a resistance of the first resistor.

3. The system of claim 1 wherein the switch is in an on state during the handshaking phase.

4. The system of claim 1 wherein the magnitude is a magnitude that conveys to the PSE that the PD has a characteristic impedance indicating it is PoE compatible.

5. The system of claim 1 wherein the first signal is at least one current limited voltage.

6. The system of claim 1 wherein the first signal is at least one voltage limited current.

7. The system of claim 1 wherein the handshaking phase comprises a detection phase where the PSE determines whether the PD is PoE compatible.

8. The system of claim 1 wherein the first pair of wires and the second pair of wires are connected together at the PD and the third pair of wires and the fourth pair of wires are connected together at the PD so that power to the PD is carried by the four pairs of wires.

9. The system of claim 1 wherein the controller controlling the PSE to apply the full PoE voltage to the first pair of wires and the second pair of wires comprises the controller coupling a full voltage output of the voltage source in the PSE to the first pair of wires and the second pair of wires.

10. A method performed by a Power Over Ethernet (PoE) system for supplying power via four wire pairs in an Ethernet cable comprising:
    providing data and voltage by Power Sourcing Equipment (PSE) over Ethernet wires to a Powered Device (PD), the PSE having a voltage source for generating a PoE voltage for transmission on the Ethernet wires, the Ethernet wires comprising four pairs of wires;
    generating a first signal by the PSE during a handshaking phase prior to a full voltage level being applied to the PD by the voltage source;
    presenting PoE characteristics to the PSE by the PD upon the PD receiving the first signal;
    the PSE further performing the steps of:
       controlling the first signal to be applied to a first set of Ethernet wires including a first pair of wires and a second pair of wires;
       detecting a first current through a first current detection component coupled between a third pair of wires in the Ethernet wires and a switch;
       detecting a second current through a second current detection component coupled between a fourth pair of wires in the Ethernet wires and the switch;
       detecting that the currents through the first current detection component and the second current detection component are approximately equal, consistent with the first pair of wires and the second pair of wires being connected together at the PD, and of a magnitude characteristic of the PD being PoE-enabled while the PSE supplies the first signal to the PD; and
       in response, controlling the PSE to apply the full PoE voltage to the first pair of wires and the second pair of wires while the switch is closed to cause the third pair of wires and the fourth pair of wires to be coupled to a low voltage.

11. The method of claim 10 wherein the first current detection component is a first resistor and the second current detection component is a second resistor having a resistance equal to a resistance of the first resistor.

12. The method of claim 10 wherein the switch is in an on state during the handshaking phase.

13. The method of claim 10 wherein the magnitude is a magnitude that conveys to the PSE that the PD has a characteristic impedance indicating it is PoE compatible.

14. The method of claim 10 wherein the first signal is at least one current limited voltage.

15. The method of claim 10 wherein the first signal is at least one voltage limited current.

16. The method of claim 10 wherein the handshaking phase comprises a detection phase where the PSE determines whether the PD is PoE compatible.

17. The method of claim 10 wherein the first pair of wires and the second pair of wires are connected together at the PD and the third pair of wires and the fourth pair of wires are connected together at the PD so that power to the PD is carried by the four pairs of wires.

18. The method of claim 10 wherein the step of controlling the PSE to apply the full PoE voltage to the first pair of wires and the second pair of wires comprises coupling a full voltage output of the voltage source in the PSE to the first pair of wires and the second pair of wires.

* * * * *